June 26, 1951 R. LAPSLEY 2,558,656
TRANSMISSION
Filed May 2, 1946 3 Sheets-Sheet 3

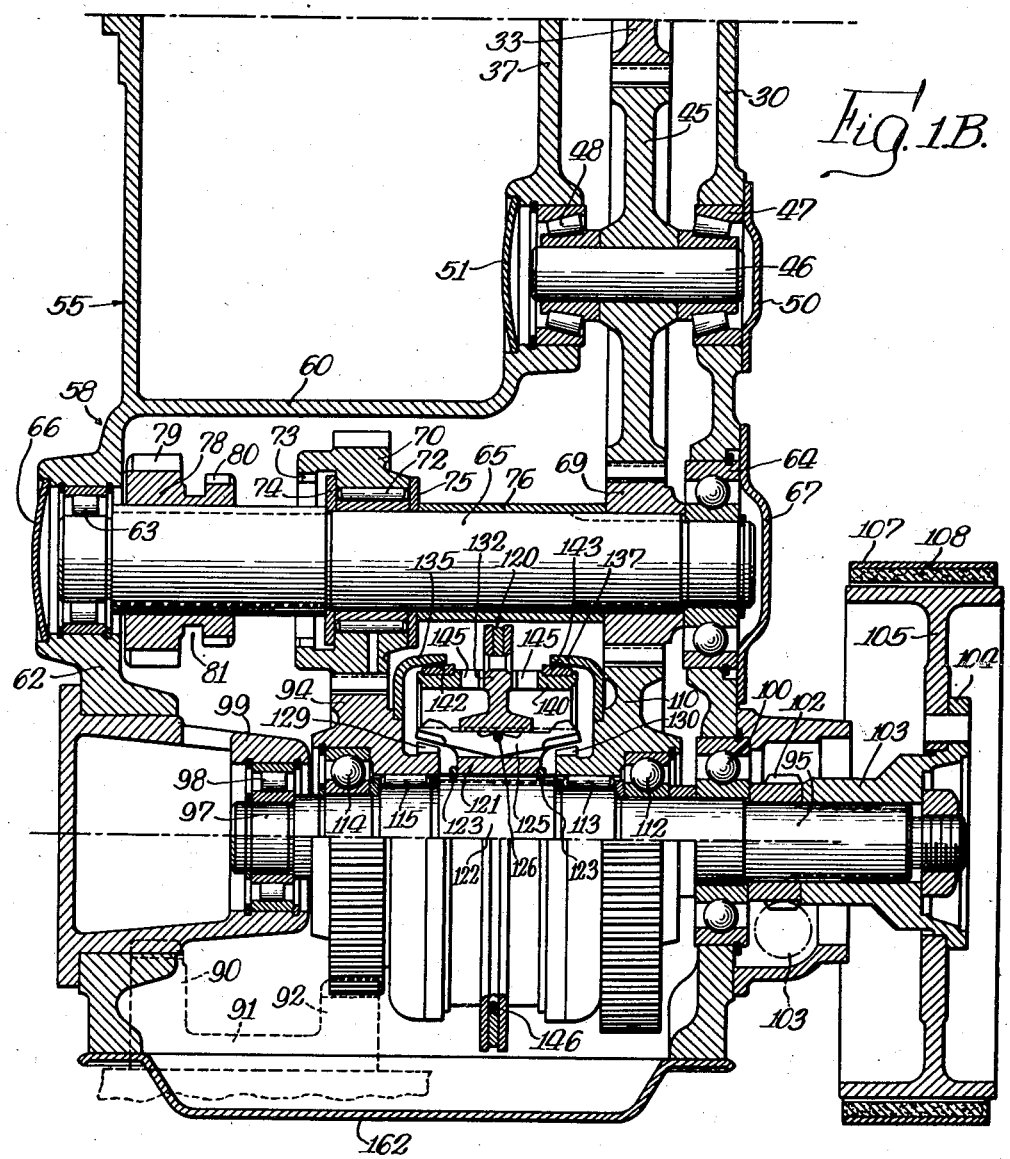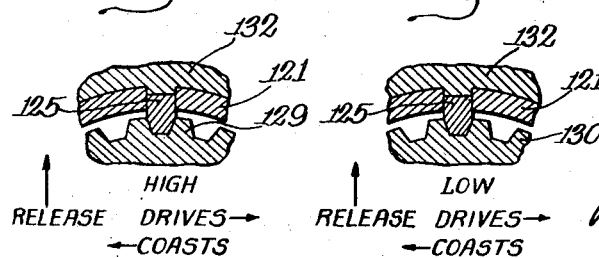

INVENTOR.
Robert Lapsley.
BY
Attys.

Patented June 26, 1951

2,558,656

UNITED STATES PATENT OFFICE 2,558,656

TRANSMISSION

Robert Lapsley, Berrien Springs, Mich., assignor to Clark Equipment Company, Buchanan, Mich., a corporation of Michigan Application May 2, 1946, Serial No. 666,663

23 Claims. (Cl. 74—732)

My present invention relates to an improvement in a transmission, and more particularly to a transmission for an automotive vehicle which may be actuated by the driver when the prime mover of the latter is running, to effect a change in the gear ratio of the transmission with the vehicle moving, or to effect with the vehicle standing still the selection of a desired starting gear ratio without disconnecting and then connecting the prime mover and the drive or output shaft through the usual manually operable friction clutch means at present employed for that purpose when such change or selection is to be made.

In the specific embodiment of my invention hereinafter disclosed, I have shown and described a transmission for use in a truck of the "house-to-house" delivery type of vehicle known in the trade as a "stand-drive" vehicle, but it will be understood that my invention is not limited thereto. In a transmission for this type of vehicle, a drop gear train is provided between the drive shaft of the prime mover, such as an internal combustion engine, and the countershaft and output shaft of the transmission to provide a low floor level for the vehicle with the propeller shaft lying substantially in the plane of the floor. The transmission of my invention is concerned with an arrangement of parts between the countershaft and an output shaft of a transmission for the purpose first above indicated, and is not limited to a drop gear train transmission. However, as will appear from the following detail description, my invention has in addition to the purposes noted has further utility in a drop gear transmission for which reason I have chosen to disclose my invention embodied in a transmission of this type.

Also, I have shown my invention embodied in a transmission comprising a fluid torque converting unit associated with the crank shaft of the prime mover, in which the torque converting unit through the medium of idler gear means has driving connection with gear means providing selective forward drive gear ratios and reverse drive. In such a transmission, a limited amount of drag occurs between the drive and driven elements of the torque converter so that the aforesaid idler gear train as well as certain of the gears of the gear mechanism providing for selection of a desired gear ratio may be in motion with the prime mover of the vehicle idling. In present forms of transmissions of this type and with the vehicle standing still and prime mover idling, actuation of the gear mechanism by the operator to effect a desired starting gear ratio frequently results in clashing of the clutch teeth of clutch mechanism associated with the gear means. In other words, with the engine idling and the transmission in neutral certain of the gears of the transmission will be in motion due to the drag in the torque converting unit so that clashing of teeth will occur when the operator effects selection of a desired gear ratio.

It is an object of my invention to provide a transmission for an automotive vehicle which when the vehicle is standing still and the prime mover thereof, such as an internal combustion engine, is running, may be actuated to select a desired forward gear ratio of drive, or reverse drive, without the incorporation therewith of conventional friction clutch means normally operative to effect breaking of the drive line as by the disconnection and connection of the drive shaft of the prime mover from the gear means and output shaft of the transmission in making such a selection.

A further object of my invention is to provide a transmission for an automotive vehicle which, when the vehicle is in motion in the forward direction and the prime mover thereof in operation, may be actuated to effect a change in the gear ratio of the transmission without incorporation therewith of conventional friction clutch means operative to effect the disengagement and engagement of the drive or crank shaft of the prime mover and the gear means and output shaft presently used in effecting such a change in forward drive gear ratio.

A further object of my invention is to provide a transmission for use with an automotive vehicle having gear means providing low and high ratio drives, and clutch means having positive jaw clutch teeth, which clutch means when the vehicle is in motion and the prime mover running is operable to effect a change from high ratio drive to low ratio drive upon releasing of the throttle means of the vehicle for the prime mover thereof, with the clutch means being adapted to prevent positive engagement of the positive jaw clutch teeth for low ratio drive until the prime mover approaches synchronism with the low ratio drive gear means, or to effect a change from low ratio to high ratio drive upon opening of the throttle with the clutch means being being adapted to prevent positive engagement of the positive jaw clutch teeth for high ratio drive until the prime mover approaches synchronism with the high ratio drive gear means.

A further object is to provide a transmission for use with an automotive vehicle having gear means providing low and high ratio drive and reverse drive, fluid torque converting means between the gear means and the prime mover of the vehicle, and clutch means associated with the gear means which when the vehicle is standing still and the prime mover running is operable for braking the gear means upon selection of a desired drive by operation of said clutch means.

A further object is to provide a transmission for use with an automotive vehicle having gear means providing a plurality of forward drive ratios and reverse drive, a fluid torque converting unit between the gear means and the prime mover of the vehicle, and clutch means associated with the gear means which, when the vehicle is standing still and the prime mover running, upon actuation of the same to provide for high ratio drive is effective to brake the gear means providing for high ratio drive against the frictional drag in the fluid torque converting unit.

The above and other objects and advantages of my invention will appear from the detail description.

Now in order to acquaint those skilled in the art with the manner of constructing and utilizing transmissions in accordance with my invention, I shall describe in connection with the accompanying drawings a preferred embodiment of my invention.

In the drawings:

Figure 1B is a vertical sectional view through the lower portion of a transmission constructed in accordance with my invention and together with Figure 1A forming the complete transmission;

Figure 4 is a detail sectional view illustrating the construction of the positive jaw clutch elements of the clutch means of my invention for effecting high ratio drive of the transmission, which clutch elements are a self-disengaging type unless biased and positively held in engagement; and Figure 5 is a detail sectional view similar to Figure 4 but illustrating the construction of the positive jaw clutch elements for effecting low ratio drive and reverse drive in the transmission of my invention.

Figure 1A:
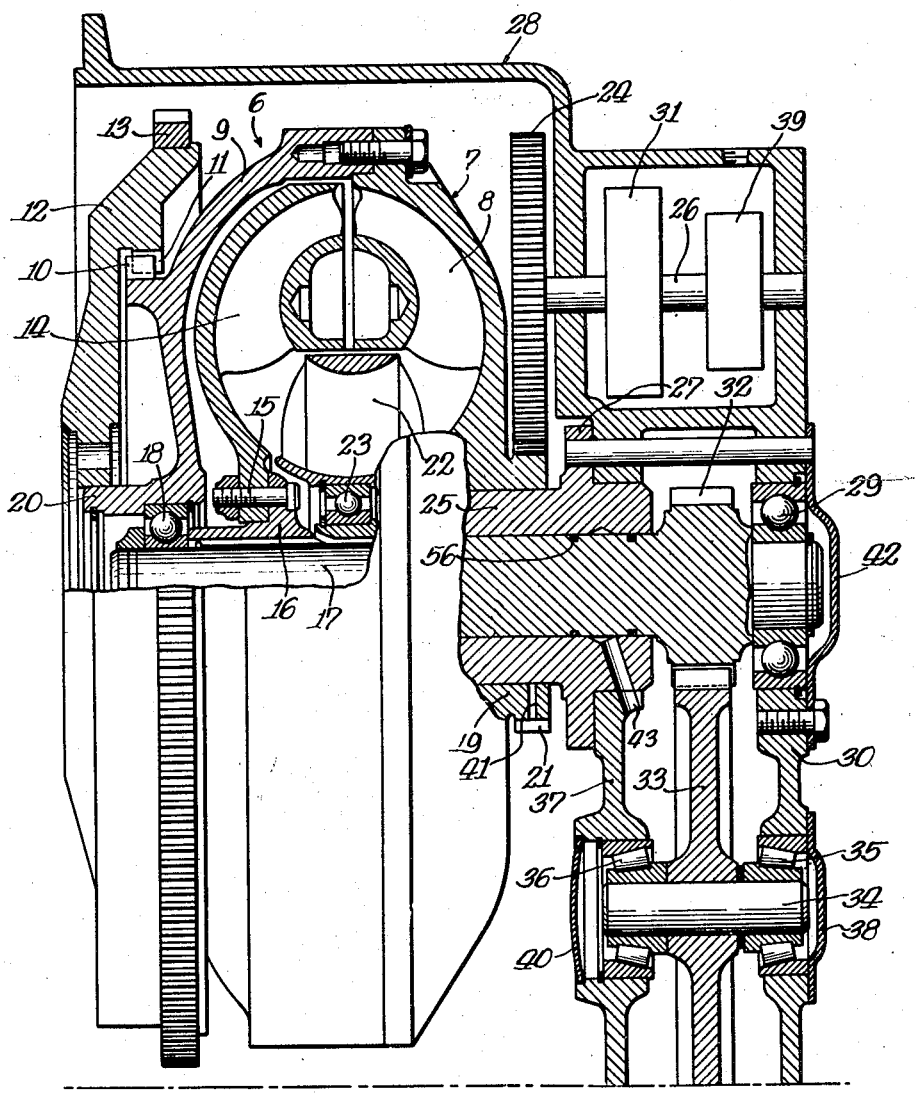
Figure 1A is a vertical sectional view through the upper portion of a transmission constructed in accordance with my invention including a portion of the housing for a torque convertor for the transmission, together with certain parts of the torque convertor and a portion of idler gear means of the transmission being shown in section.

The transmission of my invention, as shown in Figures 1A and 1B, may be viewed in its entirety by placing the two sheets showing the upper and lower portions of the transmission together along the dot and dash lines at the lower end of Figure 1A and the upper end of Figure 1B. The transmission of my invention, in its preferred form, comprises a torque convertor 6 of conventional construction and which, in the embodiment of my invention disclosed, comprises an impeller housing 7 containing the usual form of impeller 8 and in which the section 9 of the housing section 7 is provided with an external gear 10 having meshing engagement with the internal gear 11 of a fly-wheel 12. It will be understood that the fly-wheel 12 has suitable connection with the crankshaft of a prime mover, such as an internal combustible engine, for a vehicle and that the fly-wheel 12 is provided with a conventional form of starter ring 13 at the outer periphery thereof. The torque convertor 6 also comprises a rotor or driven member 14 which is suitably secured, as by a plurality of nuts and bolts 15, to a hub member 16, splined to a driven shaft 17.

The forward end of the driven shaft 17 is journaled in a ball bearing assembly 18 in the hub portion 20 of the housing section 9. Intermediate the impeller 8 and rotor or driven element 14 a stator 22 of conventional construction is arranged, which stator member is rotatably mounted upon a one-way brake assembly 23 carried on the inner end of a sleeve 25. The arrangement of the stator, together with the one-way brake 23 in association with a sleeve member, such as the sleeve 25, is a known arrangement and of itself forms no part of my present invention. The one-way brake asembly 23, as is known, provides for rotation of the stator forwardly with the rotor or driven element 14 of the torque convertor when the impeller 8 and rotor 14 are rotating substantially in synchronism, but prevents the stator from rotating in a reverse direction to serve as a reaction member in effecting torque multiplication through the fluid of the convertor from the impeller 8 to the rotor 14. The outer end of the sleeve 25 is provided with an outwardly radially extending shoulder 27, providing a means for mounting the same in the transmission housing or casing section 28. The driven shaft 17 at its outer end, is journaled in a ball bearing assembly 29 the outer race of which is retained in a suitable opening formed in the outer wall 30 of housing 28. The driven shaft 17 adjacent its outer end is formed with an integral pinion 32, which has constant meshing engagement with an idler gear 33, mounted on a stud 34, the opposite ends of which are journaled in roller bearing assemblies 35 and 36, suitably arranged in the outer wall 30 and an intermediate wall 37 of the housing 28, respectively. A cover 38 is suitably secured to the outer wall 30 adjacent the roller bearing assembly 35 and a plug 40 closes the opening in the intermediate wall 37 provided for the roller bearing assembly 36. Also a suitable cover member 42 closes the opening for the roller bearing assembly 29, in which the outer end of the driven shaft 17 is journaled. The impeller housing at its rearward end is formed with an integral sleeve portion 19 extending coaxially of the sleeve 25 and has an integral pinion 21 formed thereon having meshing engagement with a gear 24 fixed to a shaft 26 having driving connection with a cooling pump 31 and a scavenger pump 39 arranged at the upper end of the transmission casing. The pumps 39 and 31 are shown diagrammatically since they are of known construction and provide for supplying and cooling of the fluid for the torque converter, respectively. It will be seen that since the pinion 21 is formed integrally of the housing 7, that the pumps 31 and 39 will be caused to be driven whenever the prime mover of the vehicle is running. The pinion 21 is ported as at 41 to provide for leakage from the torque converter, and the sleeve 25 and a portion of wall 37 are ported as at 43 for leakage from the gear case with a sealing ring 56 being provided to prevent mixing of the heavy oil from the gear case with the fluid for the torque converter.

Figure 3:
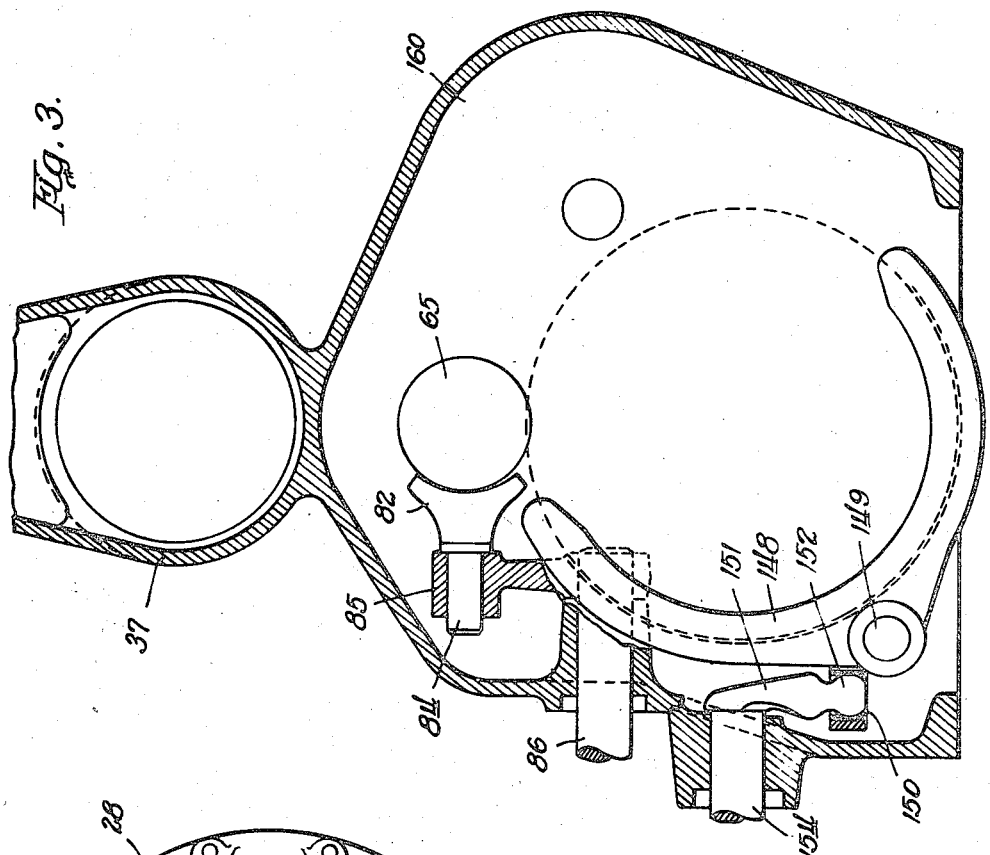
Figure 3 is a vertical sectional view of the lower portion of the transmission housing of Figure 2 and illustrating in elevation the arrangement of the shift mechanism for the gear mechanism at the lower end of the transmission.

The gear 33 has constant meshing engagement with a second idler gear 45 which is mounted on a stud 46, journaled at its opposite ends in the roller bearing assemblies 47 and 48 carried in the outer wall 30 and the intermediate wall 37, respectively of casing 28 in a manner similar to the mounting of the stud 34 of the gear 33. A cover plate 50 is suitably secured to the outer wall 30 to enclose the roller bearing assembly 47 in the outer wall. A plug 51 provides for closing of the opening in wall 37 for the roller bearing assembly 48. The transmission housing below the torque converter housing section 55, encloses suitable gear mechanism providing a two-speed forward drive and reverse drive for the transmission, in which a horizontally extending wall portion 60 extends inwardly of the intermediate wall 37, and from which wall portion 60 an inner wall 62 depends, and in which the inner wall 62 and the outer wall 30 of the transmission case 28 provide for the support of a roller bearing assembly 63 and a ball bearing assembly 64 respectively, at the inner and outer ends of a countershaft or lay shaft 65. A plug 66 provides for closing of the opening in the end wall 62 of the gear transmission housing section 58 at the inner end of the countershaft or lay-shaft 65, and a cover plate member 67 is suitably secured to the outer wall 30 for closing the opening therein for receiving the ball bearing assembly 64. The outer end of the countershaft 65 has a gear 69 suitably keyed thereto having constant meshing engagement with the gear 45 carried by the shaft 46. A gear 70 is rotatably mounted on the countershaft substantially intermediate its ends by means of the needle bearing assembly 72, and the gear 70 at its inner end is provided with internal jaw clutch teeth 73. The gear 70 is restrained against axial movement on the shaft 65 by a pair of rings 74 and 75, with the ring 74 abutting against a shoulder on the countershaft 65. A sleeve member 76 extends between the washer 75 and one side of the gear 69 for maintaining the gears 69 and 70 in the positions shown in the drawing. A clutch sleeve member 78 has splined connection with the inner end of the countershaft 65, and is provided with a reverse gear portion 79 and a jaw clutch portion 80, with the jaw clutch portion 80 and the reverse gear portion 79 being spaced to provide annular recess 81 therebetween into which a yoke 82 as shown in Figure 3, is disposed for effecting shifting of the jaw clutch member 78 axially on the countershaft 65. As shown the yoke 82 is formed with a stud portion 84 received within one end of a crank arm 85 which has connection with a shaft 86 extending laterally outwardly of one side of the transmission housing to suitable shifting mechanism for effecting rotation of the shaft 86, and which by virtue of its connection to the lever 85 effects through the yoke 82 shifting of the clutch member 78, axially on the countershaft 65. Upon shifting of the clutch member 78 to the right, as viewed in Figure 1B, the jaw clutch portion 80 thereof is adapted to be engaged with the jaw clutch 73 of gear 70 for clutching the gear 70 for rotation with the countershaft 65 for a purpose to be hereinafter described. In the position of the clutch member 78, shown in Figure 1B, the gear portion 79 has meshing engagement with gear portion 90 of a reverse gear member 91 suitably mounted on a lay shaft (partially shown in dotted lines) and in which the member 91 is provided with a second gear portion 92 having constant meshing engagement with a gear member 94 rotatably mounted on the main or output shaft 95 of the transmission. The arrangement of a reverse gear member, such as the member 91, on a lay shaft with respect to the countershaft 65 and the output shaft 95 is a known arrangement, and of itself forms no part of the present invention. It is provided, as will appear in greater detail hereinafter, for the purposes of effecting reverse drive of the main or output shaft 95. The clutch member 78, the gear 70, and reverse gear member, are arranged so that the clutch member 78 may be positioned in a neutral position in which the clutch jaw portions 79 and 80 are out of engagement with the clutch teeth 73 and gear portion 90, respectively.

The main or output transmission shaft 95, as shown, is provided with a reduced inner end portion 97, which is journaled for rotation in a roller bearing assembly 98 supported within a bearing supporting member 99 suitably secured in the inner wall 62 of the transmission housing section 58. The opposite or outer end of the main or output shaft 95 is suitably supported in a ball bearing assembly 100, which is assembled in an opening provided therefor in the outer wall 30 of the transmission housing 28. A worm gear 102 is suitably keyed to the output shaft 95 and has meshing engagement with a worm at 103 to provide a speedometer connection for the vehicle with which the transmission is associated. Also keyed to the outer end of the output or main shaft 95 is a flanged member 103 having a radial flange 104 to which is secured a brake drum 105 as by a plurality of bolts. A brake band member 107 having friction brake means 108 is associated with the brake drum 105 to provide an emergency brake for the vehicle.

As shown, a high ratio gear 110 having constant meshing engagement with the gear 69 splined to the lay shaft 65, is rotatably mounted on the output shaft 95 as by means of a ball bearing assembly 112 and the needle or pin bearing means 113. The low ratio gear 94 is also rotatably mounted on the output shaft 95 at the inner end thereof as by the ball bearing assembly 114 and the needle bearing means 115. The low ratio gear 94 has constant meshing engagement with the gear 70 rotatably mounted on the countershaft 65. Intermediate the rotatable gears 94 and 110 the main or output shaft 95 is provided with a clutch and synchronizing means indicated generally at 120, and which comprises a body member 121 having splined connection with the enlarged intermediate portion 122 of the output of main shaft 95. The body member 121 is restrained against axial movement on the output shaft 95 by the pair of snap rings 123—123 one being disposed at each end of the body member 121. The body member is provided with a plurality of axially directed peripheral slots each of which is adapted to receive a clutch rocker member 125, only one of which is shown in the drawings. The inner edges of the rocker members are beveled to provide for rocking of the rocker arms 125 radially about a central fulcrum. A suitable snap ring 126 locks the several rocker arms 125 against axial displacement within the slots provided therefor in the body member 121. It will be observed that the rocker arms 125 are adapted to be selectively rocked into engagement with the jaw clutch teeth 129 and 130 of the gears 94 and 110, respectively, to provide for positive clutching of either the gear 94 or the gear 110 to the main output shaft 95 by axial shifting movement of the collar member indicated generally at 132. The collar member 132 is adapted to ride axially on the external surface of the body member 121 with the collar member being provided with inner chamfered edges to facilitate camming action thereof with the outer edges of the opposite ends of the rocker members 125. As shown more clearly in Figures 4 and 5, the sides faces of the clutch teeth at the opposite ends of the rocker arms 125 and the clutch teeth 129 and 130 are tapered so that unless the teeth are held in positive engagement by the collar 132 the torque or driving force therebetween will expel the ends of the rocker arms out of engagement with clutch teeth 129 and 130 of the gears 94 and 110.

The gear 94 is provided on the side face thereof facing the collar 102 with an annular cup-shaped member 135 which has an axially extending portion formed with an internal tapered friction surface. The gear 110 is likewise provided with an annular cup-shaped member 137 on the side thereof facing the collar 132 and it, like the member 135, is formed with an axially extending portion having an internal tapered friction surface. A tubular member 140 is associated with the shiftable collar member 132 which is provided at its opposite edges with annular synchronizing rings 142 and 143 which are adapted to selectively engage with the internal tapered friction surfaces of the members 135 and 137 secured to the gears 94 and 110, respectively.

The collar 132 and the tubular member 140 have a plurality of spring members 146, one of which is shown in section in Figure 1B, therebetween which normally provide for positioning the collar 132 intermediate the ends of the tubular member 140, and through which initial movement of the collar member 132 to the left of its central or neutral position shown in the drawing, effects movement therewith of the tubular member 140 to the left to engage the synchronizing ring 142 with the tapered internal friction surface of the cup-shaped member 135 for synchronizing the gear 94 with the output or main shaft 95. The tubular member 140 is formed with blocking or lock-out notches 145—145 which together with the collar 132 form blocking or lock-out means of known construction effective to prevent shifting of the collar 132 relative to the tubular member and against the detent means formed by springs 146 until the tubular member and gear toward which the collar is moved are substantially in synchronism. Thus upon the gear 94 and the main or output shaft 95 being in synchronism the collar member 132 may then be shifted further to the left and relative to tubular member 140 by the releasing action of the notches 145 with the collar 132 and against the force of the detent spring means 146 to engage the left hand ends of the rocker arms 125 and effect positive engagement of the jaw clutch elements at the left hand ends of the rocker arms with the jaw clutch teeth 129 of the gear 94 without clashing therebetween. Similarly upon initial shifting movement of the collar member 132 from its central or neutral position, shown in the drawings, to the right, the tubular member 140 is also caused to be shifted to the right due to the detent springs 146 to engage the synchronizer ring 143 with the internal tapered friction surface of the cup-shaped member 137 to bring the output shaft 95 and the gear 110 into synchronism. Upon the bringing of the output shaft 95 and gear 110 into synchronism the blocking action of the notches 145 is rendered inoperative whereupon the collar member 132 may be shifted further to the right against the force of the detent springs 146 to effect positive engagement of the positive jaw clutch elements at the right hand ends of the rocker arms 125 with the jaw clutch teeth 130 of the gear 110 without clashing therebetween.

It is to be observed that the enlarged hub portion of the collar member 132 is of less axial length than the straight portions of the upper edges of the rocker arms 125 so that movement of the collar 132 to either the left or right from its intermediate or neutral position is effective for first effecting engagement of the synchronizer ring carried by the tubular member 145 with the friction surfaces of the members 135 or 137, respectively, without effecting rocking of the rocker arms about their fulcrum so that the positive jaw clutch elements at the ends of the rocker arms are not caused to be engaged with the jaw clutch teeth 129 and 134 of the gears 94 and 110, respectively, before synchronism is established therebetween and positive engagement of the positive jaw clutch means occurs. The construction of the synchronizing ring members and the association therewith of a shiftable collar 132 as described is known and it is like that disclosed in the copending application of Donald S. Dence, Serial No. 553,641, filed September 11, 1944, now Patent No. 2,412,208 dated December 10, 1946, except for the provision of the tapered faces of the clutch elements at the opposite ends of the rocker arms 125, as shown in Figures 4 and 5, and the correspondingly tapered positive jaw clutch teeth 129 and 130 of gears 94 and 110, respectively, the purpose of which will be more fully described as the present description proceeds.

Again referring to Figure 3, it will be observed that I have provided a yoke member 148 arranged for axial shifting movement on a stud 149, in which the yoke is provided with an internal pocket or recess 150 into which the ball member 152 at one end of a lever 151 fits. The lever 151 is secured to a laterally outwardly extending shaft 154 which has connection with suitable shifting mechanism for effecting shifting of the collar 132 axially of the main shaft or output shaft in a manner well known in the art.

Figure 2:
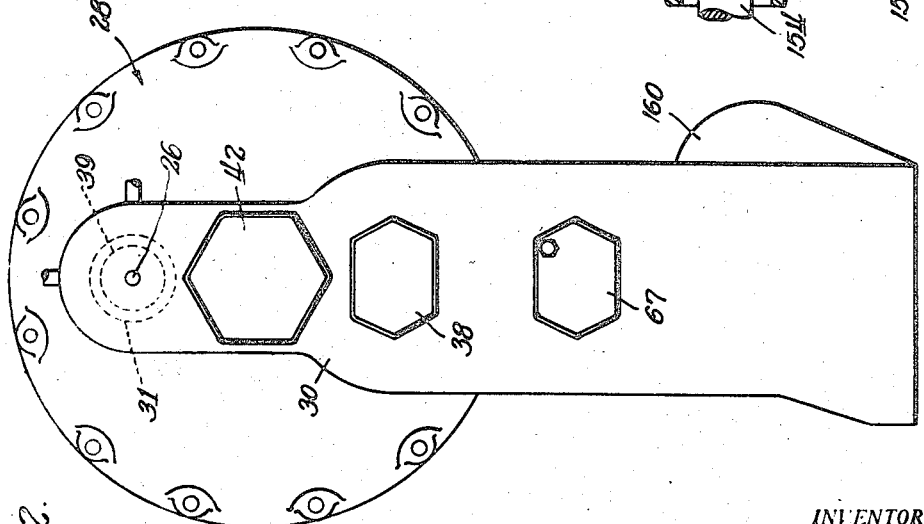
Figure 2 is an end elevational view of the transmission housing of the transmission shown in Figures 1A and 1B.

It will also be observed in Figures 2 and 3 that the transmission housing is provided with a laterally extending housing section 160 which accommodates the lay shaft carrying the reverse gear 91. The lower end of the transmission housing is closed by a removable cover 162 which is suitably secured to the transmission housing in any suitable manner.

It will be observed that the gear 69 is of smaller diameter than the gear 110 with which it has meshing engagement so that when the gear 110 is clutched or coupled to the output shaft high ratio drive is adapted to be imparted to the output shaft 95. Further, it will be seen that the gear 70 rotatable on the countershaft 65 is of smaller diameter than the gear 94 rotatable on the main or output shaft 95, but that the gear 70 is of larger diameter than the gear 69 and that the gear 94 is of smaller diameter than the gear 110 so that upon clutching of gear 70 to the countershaft and clutching of the gear 94 to the main or output shaft low ratio drive is adapted to be imparted to the output shaft 95. Also upon clutching of gear 94 to the output shaft 95 and with the clutch collar 78 shifted to its left hand position the output shaft 95 will be driven in reverse through reverse gear 91.

The operation of the transmission above described as when embodied in an automotive vehicle is as follows:

With the vehicle standing still and the engine idling, the collar member 132 may be shifted to its right hand most position to positively clutch the high ratio gear 110 to the output shaft 95. With the gear 110 clutched to the shaft 95 it will be observed that the clutch and synchronizing means 120 is effective to brake the gear train between the high ratio gear means and the torque converter against frictional drag in the latter. Under these conditions the clutch collar 78 may be shifted to its left hand most position for reverse drive or to the right for forward drive. Under the conditions assumed, i. e., with the gear 110 clutched to output shaft 95 it will be observed that the clutch collar member 78 may be shifted for either reverse or forward drive without clashing of the teeth of the clutch collar member 78 with either reverse gear 90 or the jaw clutch teeth 73 of gear 70 since neither of the several gears referred to are in motion nor does any of the engine power reach them. When the reverse gear 78 is shifted to its left hand position, as shown in Figure 1B, the gear portion 79 thereof is in meshing engagement with the gear portion 90 of the reverse gear 91, and the gear portion 92 of the reverse gear 91 is in meshing engagement with the gear 94 associated with the main or output shaft 95. Upon clutching of the gear 94 to the output shaft 95, reverse drive is provided. High ratio forward drive is adapted to be provided by clutching of gear 110 to the output shaft 95 and low ratio forward drive is adapted to be provided upon engagement of the clutch collar member 78 with the gear 70 and by clutching the gear 94 to the output shaft 95.

Assume now that gear 110 is clutched to output shaft 95 and that clutch sleeve 78 is shifted to its right hand most position to engage the teeth 80 thereof with jaw clutch teeth 73 of gear 70 and thereby clutch the latter gear to countershaft 65, the transmission above described may be made to function as follows:

Upon opening of the throttle for the engine or prime mover of the vehicle the fluid torque converting unit effects rapid acceleration of the vehicle through the drop gear train and the high ratio gears 69 and 110. When the vehicle reaches the desired forward speed in high ratio drive, the engine or prime mover will be running at high R. P. M. considerably in excess of the R. P. M. of the engine for low ratio drive provided by gears 70 and 94. Now, in order to effect the shift from high ratio to low ratio drive the throttle for the engine is released and the yoke member 148 is caused to be moved axially to effect axial movement of the collar member 132 to the left, as viewed in Figure 1B. Immediately upon the hub of collar 132 moving off of the right hand ends of the several rocker arms 125, the driving force between the jaw clutch teeth 130 of the gear 110 and the clutch elements at the right hand ends of the rocker arms 125 due to the tapered side faces thereof effects disengagement thereof with each other. The collar 132, through spring members 146, picks up the tubular member 140 and further movement to the left of collar 132 causes the synchronizer ring 142 to engage the tapered friction surface of the cup-shaped member 135, which effects synchronization of the gear 94 and the shaft 95 and when the engine speed slows down so that low ratio gear 94 is approximately synchronous with the speed of the output shaft 95. Thereupon the blocking action of the notches 145 releases and the shift may be completed by clutching of the gear 94 to the output shaft 95 by engagement of the positive jaw clutch elements at the left hand ends of the rocker arms 125 with the jaw clutch teeth 129 of the gear 94 without clashing therebetween. The vehicle is then being driven through the idler gear train, the countershaft 65 and low ratio drive gears 70 and 94.

Assuming now that with the vehicle in low ratio forward drive, as last described, and it is desired to effect a shift from low ratio drive to high ratio drive, as may be desired, for example, in encountering a grade in the road, or to effect rapid acceleration of the vehicle, it is only necessary to hold the throttle for the engine of the vehicle open and shift the yoke member 148 to effect movement of the collar 132 to the right, as viewed in Figure 1B. The initial right hand movement of collar 132 moves the hub portion thereof off the left hand ends of the rocker arm 125 and by reason of the self-disengaging arrangement of the jaw clutch teeth 129 and the clutch elements at left hand ends of the rocker arm 125 as by making the side faces of the same of tapering form, the latter are caused to be expelled by the driving force of gear 94. Further movement of the collar member 132 to the right by reason of the construction previously described effects the engagement of the synchronizer ring 143 with the friction surface of the cup-shaped member 137 fixed to the gear 110 so that by the engagement of the parts last noted the engine is released from driving through the low gear ratio provided by the gears 70 and 94 and since the throttle of the engine is opened it raises up to a higher speed. Upon the speed of rotation of the engine due to the open throttle becoming synchronous with the speed of rotation of shaft 95 and gear 110, the blocking action of the notches 145 of the tubular member 140 in effect reverses, and at that instant the shift may be completed by further movement of the collar 132 to its right hand most position, which causes positive engagement of the clutch elements of right hand ends of the rocker arms 125 with the jaw clutch teeth 130 of the gear 110.

It will thus be observed that I have provided a novel form of transmission in which a change in driving ratio from high ratio drive to low ratio drive may be effected by cutting the throttle of the engine, and that a shift from low ratio drive to high ratio drive may be effected by opening of the throttle of the engine together with the manipulation of a shiftable collar member of the clutch means which effects synchronization between the high and low ratio gears with the output shaft with the latter rotating to effect the positive engagement of positive jaw clutch teeth without the clashing thereof. In addition to effecting a shift in the transmission without any gear clash, the present transmission effects the shifting without any surging in the vehicle speed and both changes are made at synchronous speeds of the engine and no kinetic energy has to be absorbed in slipping clutches or otherwise as is now conventional with the usual forms of friction clutch means.

In effecting actuation of the transmission for reverse drive with the vehicle standing still and the engine idling, the clutch collar member 132 is first shifted to its right hand most position to effect braking of the gear train between the torque converter and the output shaft of the transmission. With the gear train being braked in the manner described, the clutch collar 78 may be shifted to its left hand position to engage the gear portion 79 thereof with the gear portion 90 of the reverse gear 91 without clashing of the gear teeth in that no engine power is being transmitted through the gears. Now, with the clutch collar 78 in its left hand position, the clutch collar member 132 may be shifted to its left hand most position to clutch the gear 94 to the output shaft 95 and upon opening of the throttle of the engine for the vehicle reverse drive will be imparted to it by rotation of the output shaft 95 through the reverse gear 91 and the gear portion 92 thereof which has constant meshing engagement with the gear 94.

While I have shown what I consider to be the preferred embodiment of my invention it will be understood that various modifications and rearrangements may be made therein without departing from the spirit and scope of my invention.

I claim:

1. In a transmission having a torque converting unit, the combination of an output shaft, gear means adapted to be disposed between said torque converting unit and said output shaft for providing a plurality of driving ratios to the latter, clutch means having normally self-disengaging clutch elements for selectively clutching said gear means to said output shaft and comprising, means for effecting the engagement of said clutch elements to effect selectively said driving ratios, and means for preventing actuation of said last named means to effect a change from one driving ratio to another driving ratio with said output shaft rotating until the gear means for the change in driving ratio being selected and said output shaft are substantially in synchronism.

2. In a transmission having a fluid torque converting unit, the combination of an output shaft, gear means adapted to be disposed between said torque converter and said output shaft for providing a plurality of driving ratios to said output shaft, clutch means comprising a body member fixed to said output shaft and positive normally self-disengaging clutch elements associated with said body member and said gear means, and means for selectively effecting the engagement of said clutch elements of said body member with the clutch elements of said gear means to effect selectively said driving ratios, said clutch means including means for preventing actuation of said last named means to effect a change from one driving ratio to another driving ratio until the gear means for the change in driving ratio being selected and said output shaft are substantially in synchronism.

3. In a transmission having, a fluid torque converting unit, the combination of an output shaft, gear means adapted to be disposed between said torque converter and said output shaft for providing low and high ratio drives to the latter, clutch means comprising a body member fixed to said output shaft and positive normally self-disengaging clutch elements associated with said body member and said gear means, and means for effecting the engagement of the clutch elements of said body member with the clutch elements of said gear means to effect selectively either said low or high ratio drives, and clutch means including means for preventing actuation of said last named means to effect a change from low ratio drive to high ratio drive, or vice versa, when said output shaft is rotating until the gear means for the ratio being selected and said output shaft are substantially in synchronism.

4. For use in an automotive vehicle having a torque converter adapted to be driven by the prime mover of the vehicle, a transmission comprising, an output shaft, a pair of gear trains each including a gear rotatable on said output shaft and arranged between the latter and said torque converter for providing low and high ratio drives to said output shaft, clutch means comprising a body member fixed to said shaft and normally self-disengaging jaw clutch teeth and jaw clutch elements associated respectively, with said rotatable gears and said body member, a collar member shiftable relative to said body member for engaging the jaw clutch elements thereof selectively with either of said jaw clutch teeth of said rotatable gears, and means between said clutch means and said rotatable gears adapted when said output shaft is rotating to prevent shifting of said collar member to effect engagement of the jaw clutch elements carried by said body member with the jaw clutch teeth of either of said rotatable gears until the latter and said output shaft are substantially in synchronism.

5. In a transmission having, a fluid torque converting unit, the combination of an output shaft, a pair of gear trains each including a gear rotatable on said output shaft and arranged between the latter and said torque converter for providing low and high ratio drives to the latter, clutch means between the rotatable gears on said output shaft including a body member fixed on said shaft and carrying radially movable rocker arms, clutch teeth on the adjacent portions of said gears for receiving opposite ends of said rocker arms in clutching engagement, an axially shiftable collar on said body member for rocking said rocker arms selectively into and out of engagement and having a neutral position with the opposite ends of said rocker arms out of engagement with said jaw clutch teeth of said rotatable gears, said jaw clutch teeth and said rocker arms in the neutral position of said collar member being arranged so that said jaw clutch teeth urge the opposite ends of said rocker arms out of engagement therewith, and means between said collar member and said rotatable gears for preventing shifting of said collar member when said output shaft is rotating to effect engagement of the ends of said rocker arms with the jaw clutch teeth of said rotatable gears to effect a change from low ratio drive to high ratio drive, or vice versa, until the rotatable gears of the gear train for the change in driving ratio being selected and said output shaft are substantially in synchronism.

6. In a transmission having a fluid torque converting unit, the combination of an output shaft, a pair of gear trains each including a gear rotatable on said output shaft and disposed between the latter and said torque converter and said output shaft for providing low and high ratio drives to said output shaft, clutch means between said gears including a body member fixed on said shaft between the rotatable gears of said gear trains thereon and carrying radially movable rocker arms, jaw clutch teeth on the sides of said gears adjacent opposite ends of said body member, said rocker arms having their opposite ends thereof formed to provide jaw clutch elements having normal self-disengaging clutching engagement with the clutch teeth of said rotatable gears, an axially shiftable collar on said body member having a neutral position in which the clutch elements of said rocker arms are out of engagement with the jaw clutch teeth of said rotatable gears, said collar member being shiftable from said neutral position in either direction to effect selectively engagement of the jaw clutch elements of said rocker arms with said jaw clutch teeth of said rotatable gears to clutch the latter to said shaft, and blocking means associated with said clutch means and said collar for preventing axial movement of the latter to effect a change from low ratio drive to high ratio drive, or vice versa, until the rotatable gear of the gear train to be clutched to said shaft to effect the change in drive ratio and said output shaft are substantially in synchronism.

7. In a transmission having a fluid torque converting unit, the combination of an output shaft, a pair of gear trains each including a gear rotatable on said output shaft and disposed between the latter and said torque converter for providing low and high ratio drives to said output shaft, clutch means between the rotatable gears including a body member fixed on said shaft and carrying radially movable rocker arms, jaw clutch teeth on the sides of said gears adjacent opposite ends of said body member, said rocker arms having the opposite ends thereof formed to provide jaw clutch elements having self-disengaging clutching engagement with the jaw clutch teeth of said rotatable gears, an axially shiftable collar on said body member having a neutral position in which the clutch elements of said rocker arms are out of engagement with the jaw clutch teeth of said rotatable gears, said collar member being shiftable from said neutral position in either direction to effect selectively engagement of the jaw clutch elements of said rocker arms with said jaw clutch teeth of said rotatable gears to clutch the latter to said shaft, synchronizing cone members on said gears, blocking means including friction members associated with said collar and initially shiftable therewith for selectively engaging said friction members with said synchronizing cone members of said gears prior to rocking of said rocker arms into clutching engagement with the jaw clutch teeth of said gears, said blocking means being effective for preventing axial movement of said collar member to effect a change from low ratio drive to high ratio drive, or vice versa, until the rotatable gear of the gear train to be clutched to said shaft to effect the change in gear ratio and said output shaft are substantially in synchronism.

8. A transmission comprising an output shaft, a pair of gears spaced axially on said output shaft and rotatable thereon, a countershaft, a pair of gears on said countershaft one each having meshing engagement with one of the rotatable gears on said output shaft, said gears on said countershaft and output shaft being adapted to provide for low and high ratio drives of the latter, clutch means comprising a body member fixed to said output shaft and positive normally self-disengaging clutch elements associated with said body member and said pair of rotatable gears on said output shaft, and means for selectively effecting the engagement of the clutch elements of said body member with the clutch elements of either of said pair of rotatable gears to effect selectively either said low or high ratio drives, said clutch means including means for preventing actuation of said last named means to effect a change from low ratio drive to high ratio drive, or vice versa, when said output shaft is rotating until the gear means for the ratio being selected and said output shaft are substantially in synchronism.

9. A transmission comprising an output shaft, a pair of axially spaced gears rotatable on said output shaft, a countershaft, a gear fixed to said countershaft having constant meshing engagement with one of the rotatable gears on said output shaft to provide a high ratio drive for said transmission, a second gear rotatable on said countershaft having constant meshing engagement with the other gear on said output shaft providing a low ratio drive for said transmission, means associated with said countershaft for clutching said second gear to the latter, clutch means comprising a body member fixed to said output shaft and positive normally self-disengaging clutch elements associated with said body member and said rotatable gears on said output shaft, means for selectively effecting the engagement of the clutch elements of said body member with the clutch elements of either of said pair of rotatable gears to effect selectively either said low or high ratio drives, and said clutch means including means for preventing actuation of said last named means to effect a change from low ratio drive to high ratio drive, or vice versa, when said output shaft is rotating until the rotatable gear thereon for the ratio being selected and said output shaft are substantially in synchronism.

10. In a transmission for an automotive vehicle including a fluid torque converting unit adapted to be driven by the prime mover of the vehicle, the combination of an output shaft, a pair of axially spaced gears rotatable on said output shaft, a countershaft, a gear fixed to said countershaft having constant meshing engagement with one of the rotatable gears on said output shaft and adapted to be driven by the driven element of said fluid torque converting unit, a second gear rotatable on said countershaft having constant meshing engagement with the other gear on said output shaft, clutch means comprising a body member fixed to said output shaft between the rotatable gears thereon and positive normally self-disengaging clutch elements associated with said body member and said pair of rotatable gears on said output shaft, selector means for selectively effecting the engagement of the clutch elements of said body member with the clutch elements of said one rotatable gear on said output shaft for clutching the same thereto, an axially shiftable clutch sleeve member on said countershaft having clutch teeth for engaging clutch teeth on said rotatable gear on said countershaft for clutching the same thereto, and said clutch means including means for preventing actuation of said selector means to effect a change from low ratio drive to high ratio drive, or vice versa, when said output shaft is rotating until the rotatable gear on said output shaft for the ratio being selected and said output shaft are substantially in synchronism.

11. The transmission of claim 10 characterized by the provision of reverse gear means having a gear portion having constant meshing engagement with one of the rotatable gears on said output shaft, and a second gear portion adapted to be engaged by the axially shiftable clutch sleeve member on said countershaft.

12. The transmission of claim 9 characterized by the provision of reverse gear means having a gear portion having constant meshing engagement with the rotatable gear on said output shaft of said high ratio drive, and a second gear portion adapted to be engaged by the clutch means associated with said countershaft.

13. The transmission of claim 10 characterized by the provision of idler gear means between the torque converter unit and the gear fixed to said countershaft.

14. In a transmission including a fluid torque converting unit having a driven element, the combination of a train of meshing idler gears adapted to be driven by the driven element of the torque converting unit, an output shaft, gear means journaled on said output shaft, said gear means being associated with said train of idler gears for providing low and high drive ratios to said output shaft, first clutch means associated with said gear means for selectively effecting low or high ratio drive to said output shaft; and second clutch means associated with said first clutch means for clutching said gear means to said output shaft, whereby the connected relation of said idler gears and gear means with the driven element of the torque converting unit and output shaft imposes the load of the idler gears, gear means and output shaft on the driven element of the torque converting unit to resist frictional drag of the driven element of the torque converting unit during idling of the latter prior to actuation of said first clutch means.

15. In a transmission including a fluid torque converting unit having a driven element, the combination of a train of meshing idler gears adapted to be driven by the driven element of the torque converting unit, a countershaft, a gear fixed to said countershaft and meshing with said train of gears, an output shaft, a gear rotatable on said output shaft in meshing engagement with said gear fixed to said countershaft, first clutch means associated with said output shaft for clutching said rotatable gear thereto; and second clutch means associated with said first clutch means for clutching said rotatable gear to said output shaft whereby the connected relation of said idler gears, fixed gear on said countershaft, and rotatable gear on said output shaft with the driven element of the torque converting unit and output shaft imposes the load of the idler gears, fixed gear, rotatable gear, and output shaft on the driven element of the torque converting unit to of said gear means with the driven element of the torque converting unit during idling of the latter prior to actuation of said first clutch means.

16. In a transmission including a fluid torque converting unit having a driven element, the combination of an output shaft, gear means between the driven element of the torque converting unit and said output shaft including a gear rotatably mounted on said output shaft, first clutch means associated with said gear means operable to drivingly connect said output shaft through said gear means to said torque converting unit, and second clutch means associated with said first clutch means for clutching said rotatable gear to said output shaft whereby the connected relation of said gear means with the driven element of the torque converting unit and output shaft imposes the load of the gear means and output shaft on the driven element of the torque converting unit to resist frictional drag of the driven element of the torque converting unit during idling of the latter prior to actuation of said first clutch means.

17. In a transmission including a fluid torque converting unit having a driven element, the combination of idler gear means adapted to be driven by the driven element of the torque converting unit, an output shaft, gear means rotatable on said output shaft in meshing engagement with said idler gear means, jaw clutch means associated with said last named gear means operable for effecting drive to said output shaft; and friction clutch means associated with said jaw clutch means for clutching said gear means to said output shaft whereby the connected relation of said idler gear means and gear means on said output shaft with the driven element of the torque converting unit and output shaft imposes the load of the idler gear means, gear means on the output shaft, and output shaft on the driven element of the torque converting unit to resist frictional drag of the driven element of the torque converting unit during idling of the latter prior to actuation of said jaw clutch means.

18. In a transmission including a fluid torque converting unit having a driven element, the combination of idler gear means adapted to be driven by the driven element of the torque converting unit, a countershaft having a gear fixed thereto in constant meshing engagement with said idler gear means, an output shaft having a gear rotatable thereon and in constant meshing engagement with said fixed gear on said countershaft, said rotatable gear on said output shaft being provided with jaw clutch teeth, jaw clutch means associated with said output shaft and operable to engage the jaw clutch teeth of said rotatable gear for clutching the same to said output shaft; and friction clutch means associated with said rotatable gear and said jaw clutch means for clutching said rotatable gear to said output shaft whereby the connected relation of said idler gear means, fixed gear on said countershaft, and rotatable gear on said output shaft with the driven element of the torque converting unit and output shaft imposes the load of the idler gears, fixed gear, rotatable gear, and output shaft on the driven element of the torque converting unit to resist frictional drag of the driven element of the torque converting unit during idling of the latter prior to engagement of said jaw clutch means with the jaw clutch teeth of said rotatable gear.

19. In a transmission having a fluid torque converting unit, the combination of idler gear means adapted to be driven by said torque converting unit, a countershaft having a gear fixed thereto having constant meshing engagement with said idler gear means, a second gear rotatable on said countershaft, a clutch member carried by said countershaft and operable for clutching said second gear to said countershaft, an output shaft having a pair of gears rotatable thereon and in constant meshing engagement one each with the fixed and rotatable gears on said countershaft, a lay shaft, reverse gearing on said lay shaft comprising a gear portion having constant meshing engagement with the rotatable gear on the output shaft having constant meshing engagement with the rotatable gear on said countershaft, said reverse gearing having a second gear portion adapted to be engaged by a gear portion of said clutch member for selectively drivingly connecting said lay shaft to said countershaft, said pair of gears on said output shaft being provided with jaw clutch teeth, jaw clutch means associated with output shaft for selectively engaging the jaw clutch teeth of said pair of gears for selectively clutching them to said output shaft, and synchronizing means associated with said pair of gears and said jaw clutch teeth for preventing clashing engagement therebetween.

20. In a transmission having a fluid torque converting unit, the combination of idler gear means adapted to be driven by said torque converting unit, a countershaft having a gear fixed thereto and having constant meshing engagement with said idler gear means, an output shaft having a gear rotatable thereon and in constant meshing engagement with said fixed gear on said counter shaft, said rotatable gear on said output shaft being provided with jaw clutch teeth, jaw clutch means associated with said output shaft and operable to engage the jaw clutch teeth of said rotatable gear for clutching the same to said output shaft, and synchronizer means between said jaw clutch means and said rotatable gear comprising a synchronizer ring fixed to said rotatable gear and being substantially of the same size as said rotatable gear for preventing clashing of said jaw clutch means with said jaw clutch teeth of said rotatable gear upon actuation of said jaw clutch means to effect engagement thereof with said jaw clutch teeth of said rotatable gear.

21. In a transmission having a fluid torque converting unit, the combination of idler gear means adapted to be driven by said torque converting unit, a countershaft having a gear fixed thereto having constant meshing engagement with said idler gear means, a second gear rotatable on said countershaft, a clutch member carried by said countershaft and operable for clutching said second gear to said countershaft, an output shaft having a pair of gears rotatable thereon and in constant meshing engagement one each with the fixed and rotatable gears on said countershaft, clutch means between the rotatable gears on said output shaft including a body member fixed on said shaft and carrying radially movable rocker arms, clutch teeth on the adjacent portions of said gears for receiving opposite ends of said rocker arms in clutching engagement, an axially shiftable collar on said body member for rocking said rocker arms selectively into and out of engagement and having a neutral position with the opposite ends of said rocker arms out of engagement with said jaw clutch teeth of said rotatable gears, said jaw clutch teeth and said rocker arms in the neutral position of said collar member being arranged so that said jaw clutch teeth urge the opposite ends of said rocker arms out of engagement therewith, and means between said collar member and said rotatable gears for preventing shifting of said collar member when said output shaft is rotating to effect engagement of the ends of said rocker arms with the jaw clutch teeth of said rotatable gears to effect a change from low ratio drive to high ratio drive, or vice versa, until the rotatable gears of the gear train for the change in driving ratio being selected and said output shaft are substantially in synchronism.

22. In a transmission having a fluid torque converting unit, the combination of idler gear means adapted to be driven by said torque converting unit, a countershaft having a gear fixed thereto having constant meshing engagement with said idler gear means, a second gear rotatable on said countershaft, a clutch member carried by said countershaft and operable for clutching said second gear to said countershaft, an output shaft having a pair of gears rotatable thereon and in constant meshing engagement one each with the fixed and rotatable gears on said countershaft, clutch means between said gears including a body member fixed on said shaft between the rotatable gears of said gear trains thereon and carrying radially movable rocker arms, jaw clutch teeth on the sides of said gears adjacent opposite ends of said body member, said rocker arms having their opposite ends thereof formed to provide jaw clutch elements having normal self-disengaging clutching engagement with the clutch teeth of said rotatable gears, an axially shiftable collar on said body member having a neutral position in which the clutch elements of said rocker arms are out of engagement with the jaw clutch teeth of said rotatable gears, said collar member being shiftable from said neutral position in either direction to effect selectively engagement of the jaw clutch elements of said rocker arms with said jaw clutch teeth of said rotatable gears to clutch the latter to said shaft, and blocking means associated with said clutch means and said collar for preventing axial movement of the latter to effect a change from low ratio drive to high ratio drive, or vice versa, until the rotatable gear of the gear train to be clutched to said shaft to effect the change in drive ratio and said output shaft are substantially in synchronism.

23. In a transmission having a fluid torque converting unit, the combination of idler gear means adapted to be driven by said torque converting unit, a countershaft having a gear fixed thereto having constant meshing engagement with said idler gear means, a second gear rotatable on said countershaft, a clutch member carried by said countershaft and operable for clutching said second gear to said countershaft, an output shaft having a pair of gears rotatable thereon and in constant meshing engagement one each with the fixed and rotatable gears on said countershaft, clutch means between the rotatable gears including a body member fixed on said shaft and carrying radially movable rocker arms, jaw clutch teeth on the sides of said gears adjacent opposite ends of said body member, said rocker arms having the opposite ends thereof formed to provide jaw clutch elements having self-disengaging clutching engagement with the jaw clutch teeth of said rotatable gears, an axially shiftable collar on said body member having a neutral position in which the clutch elements of said rocker arms are out of engagement with the jaw clutch teeth of said rotatable gears, said collar member being shiftable from said neutral position in either direction to effect selectively engagement of the jaw clutch elements of said rocker arms with said jaw clutch teeth of said rotatable gears to clutch the latter to said shaft, synchronizing cone members on said gears, blocking means including friction members associated with said collar and initially shiftable therewith for selectively engaging said friction members with said synchronizing cone members of said gears prior to rocking of said rocker arms into clutching engagement with the jaw clutch teeth of said gears, said blocking means being effective for preventing axial movement of said collar member to effect a change from low ratio drive to high ratio drive, or vice versa, until the rotatable gear of the gear train to be clutched to said shaft to effect the change in gear ratio and said output shaft are substantially in synchronism.

ROBERT LAPSLEY.

REFERENCES CITED

The following references are of record in the file of this patent:

UNITED STATES PATENTS

| Number | Name | Date |
|---|---|---|
| 2,082,826 | Frisby | June 8, 1937 |
| 2,205,794 | Jandasek | June 25, 1940 |
| 2,328,227 | Orr | Aug. 31, 1943 |
| 2,341,756 | Avila | Feb. 15, 1944 |
| 2,392,520 | Benz et al. | Jan. 8, 1946 |
| 2,412,208 | Dence | Dec. 10, 1946 |

Certificate of Correction

Patent No. 2,558,656                                              June 26, 1951

ROBERT LAPSLEY

It is hereby certified that error appears in the printed specification of the above numbered patent requiring correction as follows:

Column 15, line 59, for the words "of said gear means with" read *resist frictional drag of*;

and that the said Letters Patent should be read as corrected above, so that the same may conform to the record of the case in the Patent Office.

Signed and sealed this 28th day of August, A. D. 1951.

[SEAL]

THOMAS F. MURPHY,
*Assistant Commissioner of Patents.*